Feb. 11, 1969

J. A. DYKEMA ET AL 3,427,096

SHATTER RESISTANT REARVIEW MIRROR

Filed June 1, 1967

INVENTORS
JAMES A. DYKEMA
ROGER D. JOHNSON
BY
ATTORNEYS

United States Patent Office 3,427,096
Patented Feb. 11, 1969

3,427,096
SHATTER RESISTANT REARVIEW MIRROR
James A. Dykema and Roger D. Johnson, Holland, Mich., assignors to Donnelly Mirrors, Inc., Holland, Mich., a corporation of Michigan
Continuation-in-part of application Ser. No. 252,751, Jan. 21, 1963. This application June 1, 1967, Ser. No. 642,955
U.S. Cl. 350—288      3 Claims
Int. Cl. G02b 7/18

ABSTRACT OF THE DISCLOSURE

This disclosure relates to a caseless rearview mirror assembly for automobiles, for example. The mirror assembly comprises a glass base with a metallic reflective film thereon, a solid body forming an integral self-supporting shatter-preventing backing support of a thickness sufficient to provide the sole support for the mirror and being adhesively secured to substantially all portions of the back of the mirror with sufficient tenacity to tightly retain all fragments of glass on the support in the event of breakage of the mirror under impact. The backing support is made from a resinous material having flexibility, integral strength, and toughness sufficient to allow displacement of portions of the glass when broken under impact without breakage or tearing of the resin backing.

---

This application is a continuation-in-part of Ser. No. 252,751, now abandoned, filed Jan. 21, 1963.

This invention relates to mirrors, and more particularly to a non-shattering rearview mirror for vehicles.

In automobile accidents, a known safety hazard for passengers is presented by a rearview mirror struck on the edge by a person's head. The metal mirror case may bend, while the struck edge of the glass breaks off, leaving a jagged edge. This jagged edge is capable of severely lacerating the head, face and neck of the passenger as he is thrown forward past the mirror. For safety purposes, some vehicle manufacturers therefore employ a metallic mirror case of substantial thickness and rigidity to prevent it from bending or breaking in a manner to expose the edge glass.

Even when the frame or case is made very rigid and solid to prevent its bending, the case can then present a somewhat immovable object when struck by the passenger's head, to cause skull damage. However, even the most elaborate case cannot always prevent glass shatter and fragmentation upon impact. Moreover, with automotive design refinements, the metallic case tends to become smaller and more fragile. In fact, it would often be advantageous to eliminate the case completely, for example if the mirror is attached directly to the windshield.

It is, therefore, the primary object of this invention to provide a mirror assembly, especially a rearview mirror for a vehicle, that will not shatter, that will not leave a sharp, jagged edge when the glass edge is broken off, and that furthermore, will not be a completely rigid object to penetrate the skull. The inventive mirror herein has been proven to be non-shattering even when subjected to terrific impact tests wherein the glass was broken into countless particles. Even so, the mirror pieces remained intact. No slivers of glass were propelled into passenger's flesh. No jagged edges protrude to sever the head, face and neck, even if the impact is applied to the edge of the mirror to displace it. Moreover, the mirror can be formed with a lightweight case, or no case at all, to thereby have sufficient "give" to allow it to break away from the thrown passenger. Tests have repeatedly shown that the edge of the mirror can be displaced, with the glass breaking off and the case bending back when struck with an impact, yet without leaving jagged edges, without any flying glass fragments, and without presenting a rigid object to cause skull damage. These normally completely inconsistent factors are all achieved with the novel mirror.

It is another object of this invention to provide a non-shattering rearview mirror useable either with or without a conventional case, thereby not only adding safety qualities but aesthetic qualities. Moreover, the mirror back may be of several different colors to match the automobile decor.

It is another object of this invention to provide a non-shattering rearview mirror which not only supplies safety features, but which also inherently sealingly protects the metallic reflective mirror coating from oxidation or other chemical deterioration. The mirror, therefore, eliminates the usual separate sealing step necessary on the back of the conventional mirror before it is installed in the metal case.

It is still another object of this invention to provide a non-shattering, sealed, aesthetically appealing mirror which can be readily manufactured with the overall expense of an encased mirror form only slightly greater than that of conventional mirrors. Actually, the cost is potentially far less under production conditions than that of conventional mirrors.

It is still a further object of this invention to provide a non-shattering rearview mirror wherein the mirror face can also be simultaneously protected from any shipping or handling damage such as scratching of the glass or scratching of a delicate first surface coating of chromium or the like. Both non-shattering and face protective qualities are achieved simultaneously with a novel encapsulating process. The front face is bared just prior to use.

These and several other objects of this invention will be apparent upon studying the following specification in conjunction with the drawings in which.

Basically, the inventive rearview mirror comprises a glass base, a metallic reflective film, and a shatter-preventing, self-supporting and glass-supporting backing of a fused polyvinyl chloride resin bonded tightly and sealingly to the back of the mirror with sufficient high bonding tenacity to retain all fragments of glass from said glass support in the event of breakage under impact. At least a substantial portion of the resin backing has a predetermined thickness of sufficient dimension to provide the sole support for the glass base. The composition of the resin is such that when the backing support has the predetermined thickness, it will have sufficient flexibility, integral strength, and toughness to allow displacement of portions of the glass when broken under impact without breakage of the resin backing.

The preferred resin of polyvinyl chloride is bonded to the mirror back by an adhesion-promoting primer resin applied directly to the glass or to the metallic reflective film depending upon whether the mirror is a first surface mirror or a second surface mirror. Especially preferred is a polyvinyl chloride foam which has additional cushioning characteristics as well as tenacity, strength, toughness and self-supporting and glass-supporting capacity.

In the second form of the invention, a mounting bracket is embedded directly in the resin so that no additional metallic case is necessary.

In the third form of the invention, the entire mirror is encapsulated using an adhesion-promoting primer resin on the back of the mirror over which the polyvinyl resin is coated to be irremovable therefrom, while the front of the mirror is coated only with the polyvinyl chloride so as to be readily strippable prior to use, to thereby protect the glass face or the metallic coating of a first surface mirror during handling.

Figure 1:
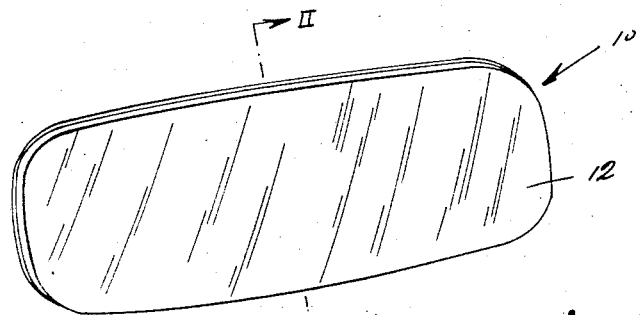
FIG. 1 is a perspective view of one form of the novel mirror.
Figure 2:
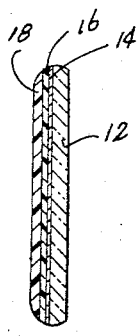
FIG. 2 is a sectional view taken on plane II—II of the mirror in FIG. 1.

Referring now to the drawings, in FIG. 1 the inventive mirror 10 includes a glass support 12 having a metallic reflective coating. The coating 14 is here shown on the back surface of the glass in a conventional manner. This film can be of silver covered with copper, but can be just silver without any overlay, in some instances.

Bonded to the back of the mirror is a layer of protective resin 18. With repeated testing it has been found that almost all resins are unsatisfactory for this purpose since they do not have the tenacity, toughness, self-supporting and glass-supporting strength, and limited flexibility necessary to render the mirror shatter-proof and safe, especially at low temperatures. It has been found that polyvinyl chloride, especially in the form of a foam, performs extremely well even at very low sub-zero temperatures, when greater than a minimum thickness. Since polyvinyl chloride does not ordinarily bond directly to metal or glass, the mirror back must be coated with an adhesion-promoting resin primer 16. This resin primer is one that will adhere to metal or glass and will blend with the vinyl plastisol to tightly bond and seal the vinyl material to the back of the mirror. This primer can be of any conventional type used normally for bonding polyvinyl chloride on metal or glass, for example, acrylates or polyepoxy resins or some other selected thermosetting or thermoplastic resin to achieve an irremovable bond and an air-tight seal between the vinyl plastisol and the mirror back. A typical example is an ammonified acrylic material. The adhering substance is preferably either a bodied adhesive containing a solvent which dries by evaporation, or alternatively, an elastomeric adhesive based on rubber in solution or suspension. The materials do not chemically react with the metallic film used.

To provide low temperature flexibility properties, plasticizers such as adipates, azelates, or sebacate esters are incorporated into the vinyl plastisol. Also, suitable conventional stabilizing agents such as metallic salts of fatty acids or soaps can be used. It is of interest to note that of the many resins upon which experiments have been conducted, the polyvinyl chloride either in the conventional or foam form is about the only satisfactory one which supplies non-shattering characteristics at low temperatures, e.g. a —20° F.

Figure 4:
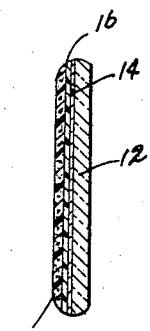
FIG. 4 is a sectional view of a modification of the inventive mirror form illustrated in FIG. 2.

Preferably, as stated previously, the vinyl material is in the form of a foam as illustrated in FIG. 4, since it still has the strength, flexibility, toughness, tenacity and self-supporting characteristics, and further has more cushioning effect. It has been shown in tests that the foam-type polyvinyl retains its flexibility and glass retention qualities even at low sub-zero temperatures and when used in much smaller amounts than the regular polyvinyl chloride. Thus, safety qualities are achieved over a large temperature range using substantially less resin. The laminate in FIG. 4, therefore, comprises a glass support 12, a metallic reflective film 14, a primer resin 16 to promote adhesion, and foamed vinyl 18'. The foaming agent for the vinyl backing is preferably one which will generate the gaseous component under the influence of the heat present during fusion of the thermoplastic material.

The gaseous agent can be carbon dioxide, for example. A typical well-known blowing agent to form this carbon dioxide under heat is azobisformamide.

For moderate temperatures, polyepoxy-polyamine resins, polyurethane, and silicone rubber materials are suitable, but not preferred. Within the very broadest aspects of this invention, these materials are pertinent. These materials require no primer resin since they adhere to the metal or glass in and of themselves. They cannot be used to fully encapsulate the mirror under normal conditions as explained hereinafter, since they are not removable from the face of the mirror unless a release agent is applied to the front of the mirror. The specific material should be selected to provide a resulting layer which is not tacky, is self-supporting, has limited flexibility, toughness, strength and tenacity to serve the non-shattering purpose required. Conceivably some of these materials could be incorporated directly with the vinyl plastisol to render the plastisol adherent to the glass, and have the non-shattering characteristics of the vinyl material at sub-zero temperature. Thus polymer blends of polyvinyl chloride are included within the broader aspects of this invention. Further, polymers of vinyl chloride can be used in the invention. Other suitable materials include polyethylene, polypropylene, polybutene-1, and copolymers thereof.

The resin backing is tightly bonded in an irremovable sealed manner to the back of the mirror and to the metallic film so that it seals the film from air and moisture. This preserves the characteristics of the film over a long life since preventing chemical deterioration such as oxidation. The resin, when cured, must have sufficient integral strength and toughness to be self-supporting and support the glass when and if broken as stated previously, and remain united without separation of its parts by ripping or cracking even under large impact on the edge of the mirror. It must furthermore have sufficient tenacity to cling to all of these fragments without allowing them to be ejected therefrom. It has been found that for sub-zero temperature accommodation, a coating thickness of at least approximately 20 mils of polyvinyl chloride should be used to retain the nonshattering qualities. For moderate temperatures as would be found for example in the Southern States in the United States, a minimum coating thickness of approximately 12 mils can be satisfactory, but not preferred. For a safety factor, the coating should be increased above these values, preferably to at least 30 mils.

Figure 5:
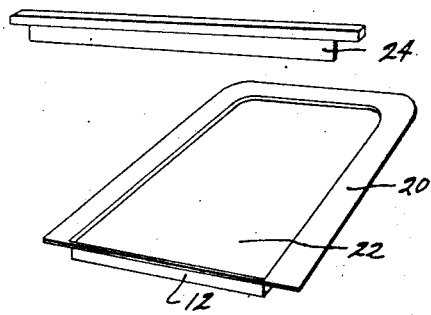
FIG. 5 is a perspective view of one method of making the novel mirror in FIGS. 2 and 3.

In order to provide sufficient coating thickness with a resin plastisol of low viscosity to seal properly, the resin is preferably applied to the mirror with the use of a stencil 20 illustrated in FIG. 5, after the primer coat has been applied and its solvent evaporated. The glass support 12 is placed face down, with its metallic film and primer coat up, so that the stencil can be placed thereon. The unfused resin material is then poured into the central opening 22 defining the edge of the mirror, and a squeegee 24 of conventional type is passed across the stencil. Then the stencil is removed and the resin fused at temperatures of approximately 300 to 350° F. in a conventional manner. This temperature range can vary depending upon whether the plastisol is first soaked at a low temperature, or whether the rate of heat application is large at first, and other such variable factors well-known to those in the art.

Other methods of producing the novel articles of the invention are disclosed and claimed in the applications of Konrad H. Marcus, Ser. No. 439,041, filed Mar. 11, 1965, and Robert E. Underhill, Ser. No. 542,374, filed Apr. 13, 1966.

Figure 3:
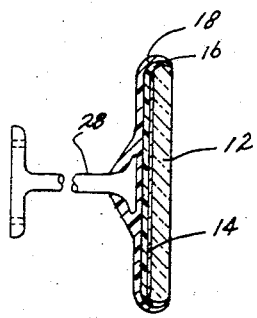
FIG. 3 is a sectional view of a second form of the inventive mirror.

In the modified form of the invention illustrated in FIG. 3, the mirror assembly is shown in a form which does not require an external metallic case. The glass support 12 has a metallic reflective film 14. The primer coat 16 and non-shattering polyvinyl chloride resin coat 18 provide the supporting fragment retention qualities. The mirror may be coated around the edges of the glass as well as over the entire back. Embedded in the resin is a bracket 28 which has an outer end that may be mounted to the dashboard, to the windshield retention ring, or conceivably may be bonded directly to the windshield if desired. No additional metallic case is used. By incorporating known colorants into the uncured plastic, the resulting product can be of different colors to match a particular automobile decor to be aesthetically appealing. In the form of the invention, if a person is thrown against the mirror with impact, his head does not need to bend the metallic case before the mirror "gives." Further, no possibility of lacerations exists by fragments of the glass protruding from the edge of the mirror since all portions of the glass remain tightly bonded to the resin as the glass breaks and the resin bends rearwardly.

Figure 6:
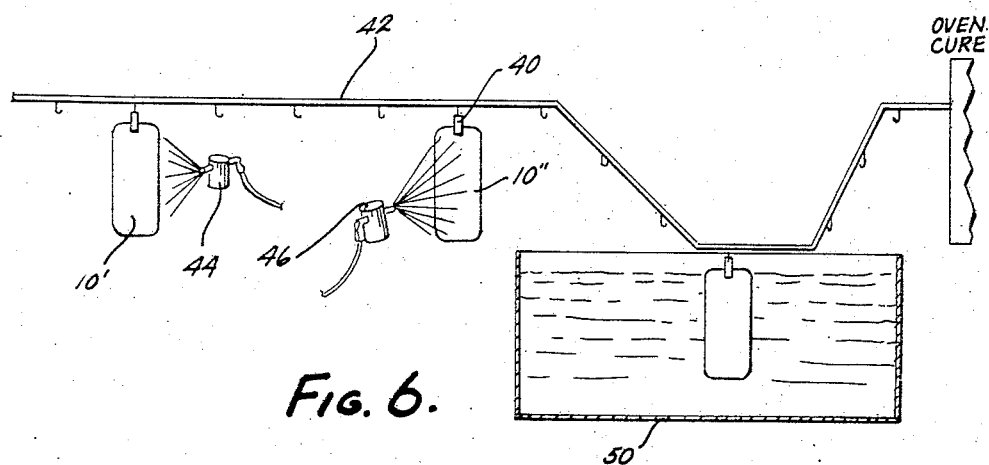
FIG. 6 is a schematic, elevational diagram of a novel method of making the third form of the inventive mirror.
Figure 7:
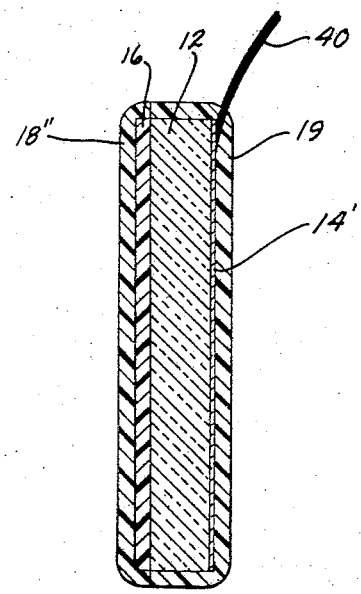
FIG. 7 is a sectional view of the third form of the inventive mirror formed by the method in FIG. 6.

In the form of the invention illustrated in FIGS. 6 and 7, not only is the back of the glass provided with a non-shattering, irremovable, polyvinyl chloride resin layer tightly bonded to the mirror, but the entire glass is encapsulated to create a protective polyvinyl chloride coating on the front of the glass during handling and shipping. This front portion is strippable or removable prior to use because no adhesive primer is applied to the glass before the polyvinyl chloride is coated thereon. The glass support 12 has a metallic reflective coating which may be on the back adjacent the primer coating 16 as in the above forms of the invention, or may be a chromium, first surface reflective coating 16' on the front of the mirror. Referring to FIG. 6, the mirror blank 10' comprises the glass support with the metallic film vacuum coated thereon. Since this chromium coating on the front surface is delicate and readily scratched or damaged, this protective polyvinyl chloride layer is very significant.

Preferably a tab 40 is adhered to the front surface of the mirror for stripping the material therefrom. This tab may be cellophane tape, an adhered paper tab, or some other equivalent. If desired, the mirror may be suspended on a conveyor 42 (shown diagrammatically) by this tab during the several steps of the encapsulating process.

Preferably, a protective coating is sprayed by a conventional spray means 44 on the front side of the mirror to prevent the face from being coated with the adhesive primer. The primer is then subsequently sprayed from a conventional sprayer 46 onto the back of the mirror as illustrated at 10". The primer is then allowed to dry sufficiently to enable the solvent to completely evaporate, since excess solvent in the primer would cause bubbling of the protective overlying polyvinyl chloride resin layer. After the solvent has evaporated, the mirror is immersed in the polyvinyl resin tank 50 until the required thickness of protective coating builds up on the entire mirror including the area around tab 40 as illustrated in FIG. 7. After the mirror is removed from the resin bath, it is heated and is then ready for shipment. Since the adhesion promoting primer 16 is on the back of the mirror, the resin 18" adhering to the back becomes irremovable for shatter-proofing. The resin coating on the glass front or the chromium surface 14', however, is merely a temporary expedient to provide safe handling of the structure. During shipment and handling, prior to installation, therefore, the mirror is kept encapsulated. Just prior to use and/or installation, tab 40 is pulled to strip the front coating 19 from the mirror.

If desired, tab 40 need not even be utilized since it has been found with repeated tests, that the polyvinyl chloride may be readily stripped from the front of the mirror without any difficulty. It leaves the mirror face completely clean and in perfect condition.

We claim:
1. A caseless rear view mirror assembly for use in the inside of motor vehicles comprising, a glass base; a metallic reflective film on said base; a solid body forming an integral self-supporting shatter-preventing backing support of a resinous material having at least a substantial portion thereof a predetermined thickness of sufficient dimension to provide the sole support for said mirror and to provide a body in which a support means can be embedded, said backing support being secured to substantially all portions of the back of said mirror with sufficient high bonding tenacity to tightly retain all fragments of glass on said support in the event of breakage under impact, the composition of said resinous material being such that when said backing support has said predetermined thickness, it will have sufficient flexibility, integral strength, and toughness to allow displacement of portions of said glass when broken under impact without breakage or tearing of the resin backing; and support means embedded within said backing support providing means for attaching and supporting said assembly to a support located within a motor vehicle.

2. The caseless mirror assembly of claim 1 wherein said resinous material is a foamed resin bonded to the back of said mirror.

3. The caseless mirror assembly of claim 1 wherein said resinous material is a polymer of vinyl chloride, and an adhesion promoting resin primer coating is provided between said vinyl chloride polymer backing support and said glass base.

References Cited

UNITED STATES PATENTS

| 2,352,923 | 7/1944  | Turner.   |         |
|-----------|---------|-----------|---------|
| 1,786,958 | 12/1930 | Oestnaes. |         |
| 2,103,538 | 12/1937 | Kolb.     |         |
| 2,307,568 | 1/1943  | Colbert.  |         |
| 2,466,625 | 4/1949  | Ulmer     | 350—288 |
| 2,858,603 | 11/1958 | Herrmann. |         |
| 2,910,915 | 11/1959 | Harris.   |         |
| 3,136,651 | 6/1964  | Spessard  | 117—21  |
| 3,248,273 | 4/1966  | Boicey    | 161—45  |

FOREIGN PATENTS

| 809,433 | 12/1936 | France.        |
|---------|---------|----------------|
| 404,595 | 4/1932  | Great Britain. |
| 708,315 | 5/1954  | Great Britain. |
| 863,415 | 3/1961  | Great Britain. |
| 880,999 | 11/1961 | Great Britain. |

DAVID SCHONBERG, *Primary Examiner.*

J. W. LEONARD, *Assistant Examiner.*

U.S. Cl. X.R.

161—186, 190; 248—467; 350—67